US010012837B2

(12) United States Patent
Kuwabara

(10) Patent No.: US 10,012,837 B2
(45) Date of Patent: Jul. 3, 2018

(54) HEAD-UP DISPLAY APPARATUS FOR VEHICLE

(71) Applicant: CALSONIC KANSEI CORPORATION, Saitama (JP)

(72) Inventor: Kouji Kuwabara, Saitama (JP)

(73) Assignee: CALSONIC KANSEI CORPORATION, Saitama (JP)

(*) Notice: Subject to any disclaimer, the term of this patent is extended or adjusted under 35 U.S.C. 154(b) by 0 days.

(21) Appl. No.: 15/326,219

(22) PCT Filed: May 19, 2015

(86) PCT No.: PCT/JP2015/064331
§ 371 (c)(1),
(2) Date: Jan. 13, 2017

(87) PCT Pub. No.: WO2016/013283
PCT Pub. Date: Jan. 28, 2016

(65) Prior Publication Data
US 2017/0199381 A1    Jul. 13, 2017

(30) Foreign Application Priority Data

Jul. 25, 2014  (JP) .................................. 2014-152227

(51) Int. Cl.
*G02B 27/01* (2006.01)
*B60K 35/00* (2006.01)
(Continued)

(52) U.S. Cl.
CPC .......... *G02B 27/0149* (2013.01); *B60K 35/00* (2013.01); *G02B 5/208* (2013.01);
(Continued)

(58) Field of Classification Search
CPC ...... G02B 27/01; G02B 5/20; G02B 2027/01; B60K 35/00; B60K 2350/10; B60K 2350/20; B60K 2350/92; H04N 9/31
See application file for complete search history.

(56) References Cited

U.S. PATENT DOCUMENTS 8,289,229 B2    10/2012   Ishikawa et al.
2008/0049331 A1   2/2008   Nakamura et al.
(Continued)

FOREIGN PATENT DOCUMENTS

CN          103026284        8/2015
DE     10 2007 035 255      2/2008
(Continued)

OTHER PUBLICATIONS

International Search Report dated Jul. 28, 2015 in International (PCT) Application No. PCT/JP2015/064331.

*Primary Examiner* — Sultan Chowdhury
*Assistant Examiner* — Danell L Owens
(74) *Attorney, Agent, or Firm* — Wenderoth, Lind & Ponack, L.L.P.

(57) ABSTRACT

A dustproof cover having a reduced size in a depth direction is formed. In displaying a virtual image visible to a driver by reflecting projection light projected in front of a driver on a windshield (light-transmitting member), a dustproof cover provided in a path of the projection light to close an opening includes a recessed surface provided throughout a front and rear direction of a vehicle, and a cylindrical surface provided such that the recessed surface is continuous throughout a right and left direction of the vehicle. Curvatures of the recessed surface are configured to increase toward a front side of the vehicle, and therefore outer light entering the opening from a position above the vehicle is reflected in a direction invisible to the driver.

8 Claims, 6 Drawing Sheets

(51) Int. Cl.
*G02B 5/20* (2006.01)
*H04N 9/31* (2006.01)

(52) U.S. Cl.
CPC ....... *G02B 27/0101* (2013.01); *H04N 9/3185* (2013.01); *B60K 2350/1072* (2013.01); *B60K 2350/2052* (2013.01); *B60K 2350/2095* (2013.01); *B60K 2350/921* (2013.01); *G02B 2027/011* (2013.01)

(56) References Cited

U.S. PATENT DOCUMENTS

| | | |
|---|---|---|
| 2008/0238814 A1 | 10/2008 | Ishikawa et al. |
| 2013/0076791 A1 | 3/2013 | Moussa et al. |

FOREIGN PATENT DOCUMENTS

| | | | |
|---|---|---|---|
| DE | 10 2008 015 997 | | 10/2008 |
| JP | 11-23997 | | 1/1999 |
| JP | 11-119711 | | 4/1999 |
| JP | 2008-40091 | | 2/2008 |
| JP | 2008-268883 | | 11/2008 |
| JP | 2009-132221 | | 6/2009 |
| JP | 2012-58294 | | 3/2012 |
| JP | 2013-32087 | | 2/2013 |
| JP | 2013032087 A | * | 2/2013 |
| JP | 2014-26244 | | 2/2014 |

* cited by examiner

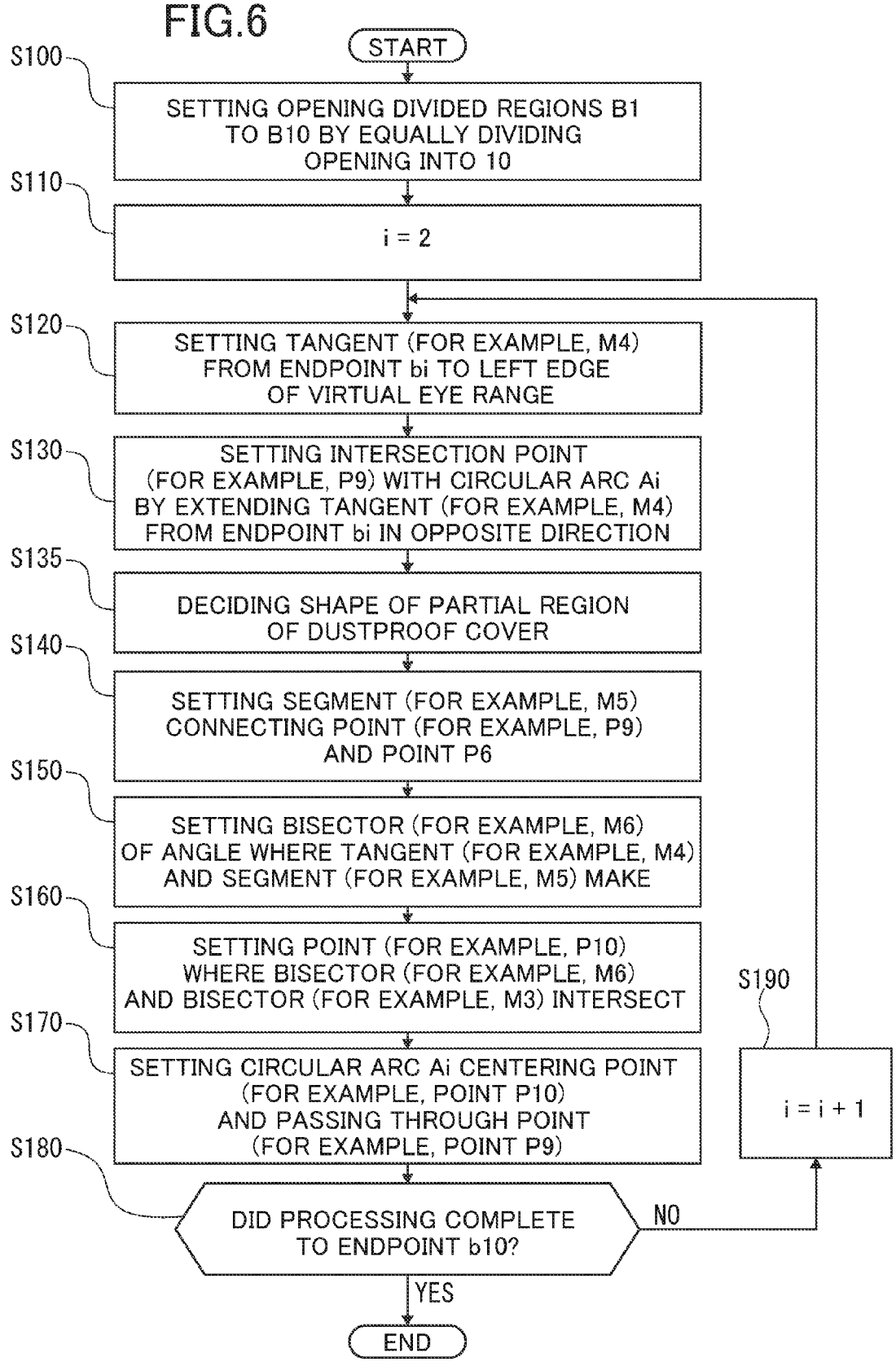

HEAD-UP DISPLAY APPARATUS FOR VEHICLE

TECHNICAL FIELD

The present invention relates to a head-up display apparatus for vehicle that images a virtual image in front of a driver to display necessary information.

BACKGROUND ART

In recent years, a head up display apparatus for vehicle which projects a display image onto a windshield of a vehicle to image a virtual image in front of a driver and which is configured to be capable of visually recognizing the display image without lowering driver's eyes, even during driving, is implemented (for example, see JP2013-32087A).

The head-up display apparatus for a vehicle disclosed in JP2013-32087A, for example, includes a recess surface-shaped dustproof cover provided to reflect outer light (sun light or street light) entered an inside from an outside of the windshield toward a position invisible to the driver.

However, in such a head-up display apparatus for a vehicle, the dustproof cover is configured by a recessed surface having a fixed curvature, for example. A size of the dustproof cover in an inside direction (depth direction) of an instrument panel therefore becomes large. In addition, a space of an inside of the instrument panel (inside of the vehicle) necessary to contain the head-up display apparatus for a vehicle increases toward a depth side of the vehicle as a size in the depth direction of the dustproof cover increases. As a result, there is a problem that a large installation space is necessary for the inside of the vehicle.

This problem notably appears, in particular, in a head-up display apparatus for vehicle that displays a virtual image of a large size at a position of a large imaging distance (remoteness). In other words, in a head-up display apparatus for a vehicle executing a large screen-remote imaging, a passing area of a light flux passing through an upper surface of the instrument panel toward the windshield becomes large in order to accomplish the remoted imaging distance by increasing a magnification ratio of the display image. It is, therefore, necessary to increase a size of an opening provided in the upper surface of the instrument not to shield the passing area.

Accordingly, since the size of the dustproof cover provided to close the wide opening in this way also increases, a size of the dustproof cover in the depth direction becomes large and a wide installation space must be secured in the inside of the vehicle.

SUMMARY OF THE INVENTION

The present invention is made in view of the above problem. It is an object of the present invention to downsize a space of an interior of a vehicle needed to install a head-up display apparatus for vehicle provided with a dustproof cover on the vehicle.

To solve the above problem, a head-up display apparatus for a vehicle that reflects projection light projected in front of a driver on a light-transmitting member and displays a virtual image visible to the driver includes an opening through which the projection light passes from a position below a vehicle, and a dustproof cover provided to close the opening and reflect outer light entering the opening from a position above the vehicle toward a direction invisible to the driver. The dustproof cover includes a recessed surface having curvatures increasing (radiuses of the curvatures are smaller) as the curvatures go to a front side of the vehicle, and a cylindrical surface that the recessed surface is continuous throughout a right and left direction of the vehicle, when viewing the vehicle from above.

Advantageous Effects

The head-up display apparatus for vehicle includes the dustproof cover having the above-described configuration. The size of the dustproof cover in the depth direction can therefore be downsized. It is therefore possible to reduce the space of the inside of the vehicle necessary to contain the head-up display apparatus for vehicle.

BRIEF DESCRIPTION OF DRAWINGS

FIG. 6 is a flow chart illustrating the design procedures shown in FIG. 5.

DETAILED DESCRIPTION OF THE INVENTION

A concrete embodiment of a head up display apparatus for a vehicle according to the present invention will be described hereinafter with reference to the accompanying drawings. In particular, embodiment 1 is first described.

Figure 1:
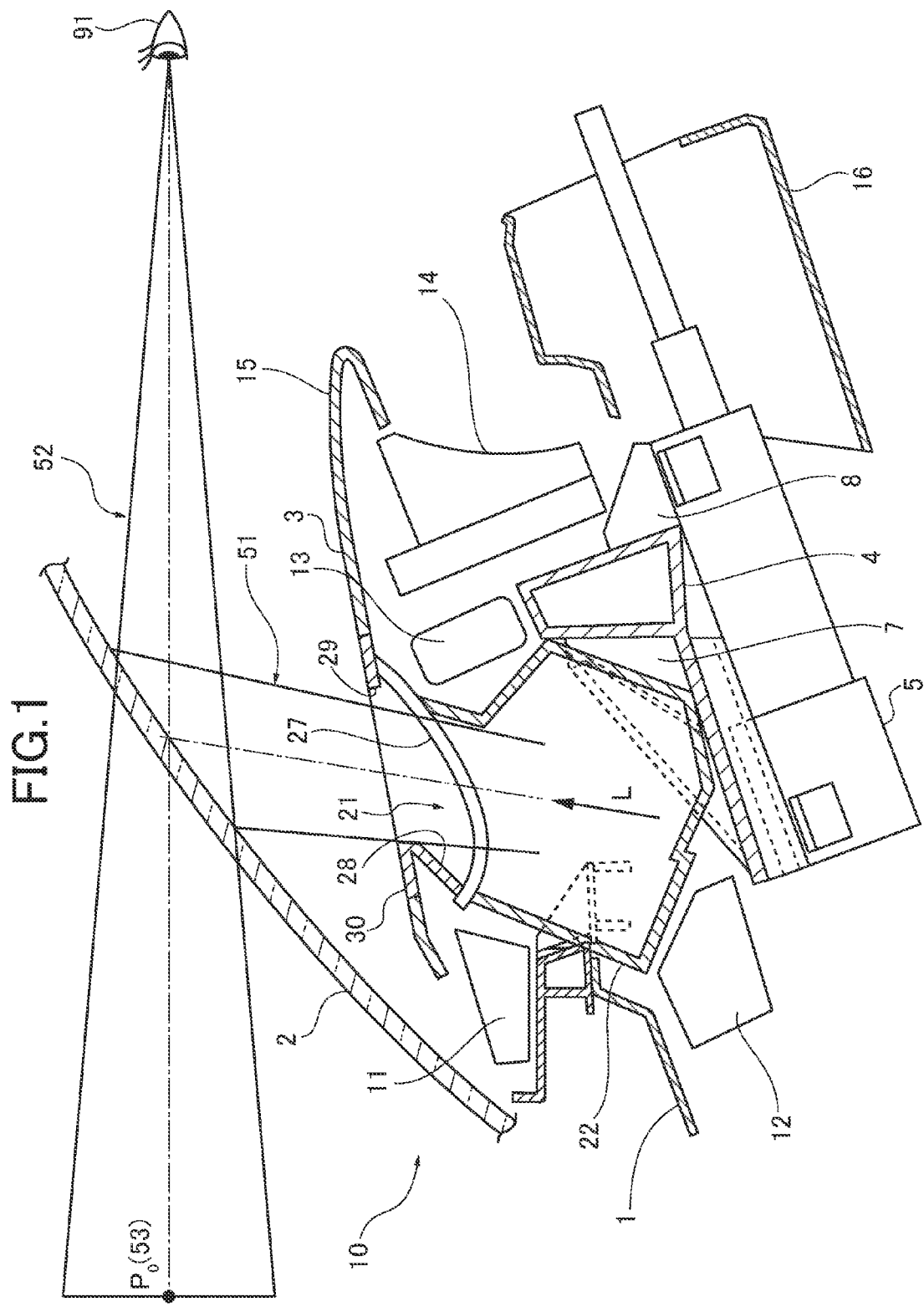
FIG. 1 is a longitudinal sectional view of an instrument panel provided with a head-up display for a vehicle according to Embodiment 1 of the present invention.
Figure 2A:
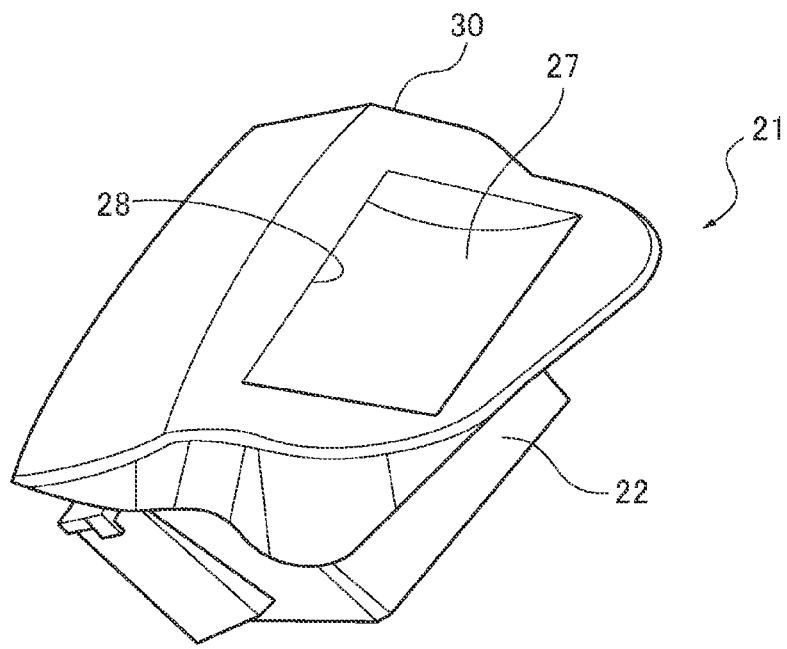
FIG. 2A is a perspective view of an appearance of a casing constituting the head-up display for vehicle.
Figure 2B:
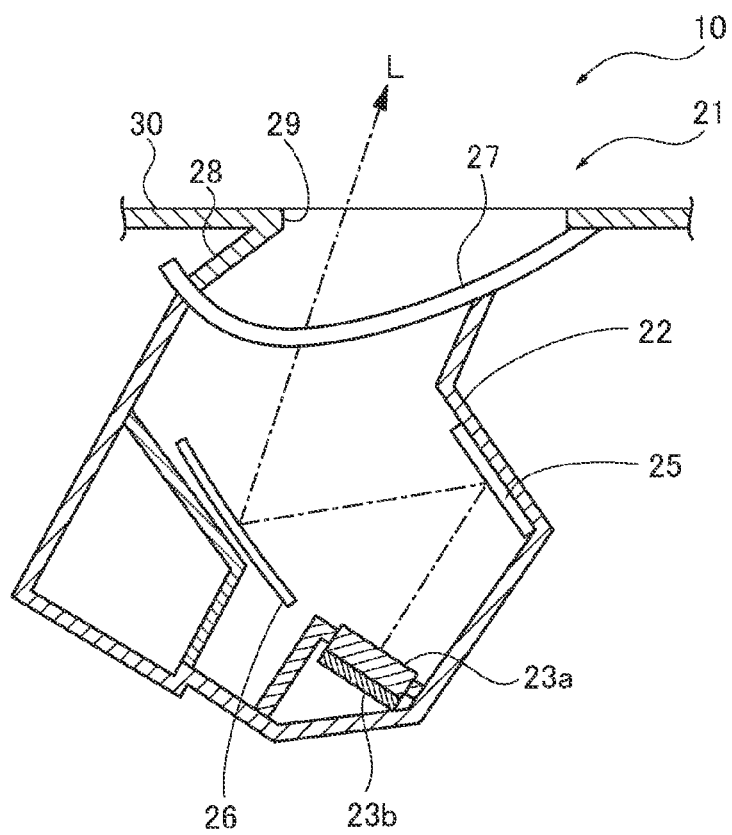
FIG. 2B is a longitudinal sectional view taken along a front and rear direction of a vehicle in a state where the casing shown in FIG. 2A is installed on the vehicle.

FIGS. 1, 2A, and 2B are longitudinal sectional views illustrating a structure of a head-up display apparatus for vehicle according to one embodiment of the present invention. The entire configuration of the head-up display apparatus for vehicle 21 is first described with reference to FIGS. 1, 2A, and 2B. The entire configuration is as follows.

A front wall panel 1 of a cabin and a windshield 2 (light-transmitting member) are provided on a front portion of the cabin in a vehicle 10 such as an automobile, as shown in a longitudinal sectional view of FIG. 1. An instrument panel 3 which is configured to cover the front wall panel 1 of the cabin is provided on a lower side of the windshield 2.

A strength member for a vehicle body 4 is positioned in a rear side (right side of paper surface of FIG. 1) of the vehicle 10 relative to the front wall panel 1, extends in a vehicle width direction (perpendicular direction to the paper surface of FIG. 1), and is disposed in the instrument panel 3. A not-shown column bracket to mount a steering column 5 is provided on a lower portion of the strength member for the vehicle body. The column bracket (not shown) is divided into a column lower bracket 7 placed in a front side of the vehicle 10 and a column upper bracket 8 placed in the rear side of the vehicle 10. The steering column 5, the column lower bracket 7, and the column upper bracket 8 are fastened by fasteners such as bolts and nuts which are not shown.

Air conditioning ducts 11 and 12, a harness 13 (bundle of wires), a metering device 14, and so on which are arranged in order from the front side of the vehicle 10 are further provided on the instrument panel 3 (in an upper side thereof). A meter hood 15 which covers upper portions of the metering device 14 is provided integrally with or separately from the instrument panel 3. A column cover 16 is attached to a portion of the steering column 5 projecting from the instrument panel 3 in the rear side of the vehicle 10. Note that, since arrangement places for components in the instrument panel 3 depend on a vehicle, the explanation as described above is one example.

Here, the front wall panel 1 is disposed below the windshield 2 (light-transmitting member) and configured by a dash panel parting between the cabin and an engine room. The strength member for vehicle body 4 is referred to as a cross car beam, steering support member or the like, and normally configured by a metallic circular pipe. In this case, the strength member for vehicle body 4 is made of a metal or light alloy and has a non-circular section (for example, a rectangular section). The strength member for vehicle body 4 may be configured by any of the above. The air conditioning duct 11 is a duct (defroster duct) to blow conditioning air to the windshield 2 to prevent the windshield from fogging. The air conditioning duct 12 is a duct (ventilator duct) to blow conditioning air to an occupant(s).

In addition, a head-up display apparatus for vehicle 21 is provided at a position above the column lower bracket 7 and between the air conditioning duct 11 and the harness 13. The instrument panel 3 is provided with an opening 29 which is cut at an upper part of the position where the head-up display apparatus for vehicle 21 is mounted and through which a flux emitted from the head-up display apparatus for vehicle 21 and imaging a virtual image passes between the head-up display apparatus for vehicle 21 and the windshield 2 (light-transmitting member).

The head-up display apparatus for vehicle 21 includes a casing 22 containing a display necessary to display a virtual image and an imaging optical system, a dustproof cover 27 provided to close the casing 22, a finisher cover 30 provided above the dustproof cover 27, and a rising wall 28 which is configured as a part of the finisher cover 30 and rises upwardly from a vicinity of a front side to extend in a right and left direction of the vehicle 10. Note that an infrared reflection coating is applied to the dustproof cover 27 to prevent infrared rays from entering an inner portion of the casing 22 through the dustproof cover from an exterior of the vehicle 10, thereby preventing a rise in temperature in the inner portion of the casing 22.

Next, a detailed configuration of the head-up display apparatus for vehicle 21 is described with reference to FIGS. 2A and 2B. FIG. 2A is a perspective view of an appearance of the casing 22 constituting the head-up display apparatus for vehicle 21. FIG. 2B is a longitudinal sectional view taken along a longitudinal direction of the vehicle 10 in a state where the casing 22 shown in FIG. 2A is mounted on the vehicle 10, in which a left side of space shows the front side of the vehicle 10.

As shown in FIG. 2B, the head-up display apparatus for vehicle 21 includes an image display part 23a contained in the casing 22 and configured by a liquid crystal panel which displays an image, video or the like, a lighting part 23b which is configured by a plurality of LEDs and illuminates the image display part 23a from a back surface thereof, light path-forming components 25, 26 which reflect the image displayed on the image display part 23a along an arrow L, guides it to the windshield 2 (FIG. 1) and projects it thereon, the forementioned dustproof cover 27, and the foregoing rising wall 28.

Here, the dustproof cover 27 has a function which guides light passing through the light path-forming components 25, 26 to the windshield 2 (FIG. 1) and reflects natural light made incident from an exterior of the vehicle 10 toward a direction where a driver is not visible. The dustproof cover is configured by a resin material or glass such as transparent polycarbonate having a fixed thickness. In addition, the dustproof cover 27 has a recessed surface in the longitudinal direction (right and left direction of the space of FIG. 2B) of the vehicle 10, and a cylindrical surface in which the recessed surface is continuous in the right and left direction (direction perpendicular to the space of FIG. 2B) of the vehicle 10. The rising wall 28 is a so-called areflexic wall absorbing light entered the rising wall 28 without reflecting.

The dustproof cover 27 is mounted on an upper edge of the casing 22 to close an exit of light which is emitted from the casing 22 to an exterior and is represented by the arrow L in FIG. 2B. The rising wall 28 is configured as a part of the finisher cover 30 provided above the dustproof cover 27, as shown in FIG. 2B.

The foregoing light path-forming components 25, 26 are configured by reflection mirrors (one or more plan mirrors or convex mirrors as the light path-forming components 25 and concave mirrors as the light path-forming components 26), which guide the image displayed on the image displaying part 23a toward the windshield 2 (FIG. 1). The number or type of optical parts forming the light path-forming components 25, 26 is not limited to the above-described configuration, and the optical parts as designed suitably are used.

The image display part 23a may be configured by not only the liquid crystal panel but also a DLP system in which light emitted from the LED is scanned by a micro mirror to generate a displaying image or laser system in which light emitted from a laser light source is scanned to generate the displaying image. However, when using the DLP system or the laser system, a screen projecting the displaying image other than the light path-forming components 25, 26 is required.

Returning to FIG. 1 again, a light flux 51 emitted from the image display part 23a (FIG. 2B) and passing through the opening 29, as indicated by the arrow L (FIG. 2B) is reflected on the windshield 2 (light-transmitting member) toward the eye balls 91 of a driver as a reflection light flux 52. When extending the reflection light flux 52 to an outside of the windshield 2, the driver recognizes that an image displayed on the image display part 23a (FIG. 2B) as a virtual image is imaged on a position including a point $P_0$ in front of the windshield 2 by a predetermined distance from the windshield.

Next, a method of setting a shape (curvature) of the dustproof cover 27 reflecting the outside light incoming in the vehicle from above toward a direction where the driver cannot see is described with reference to FIGS. 3 and 5. The method is as follows.

Figure 3:
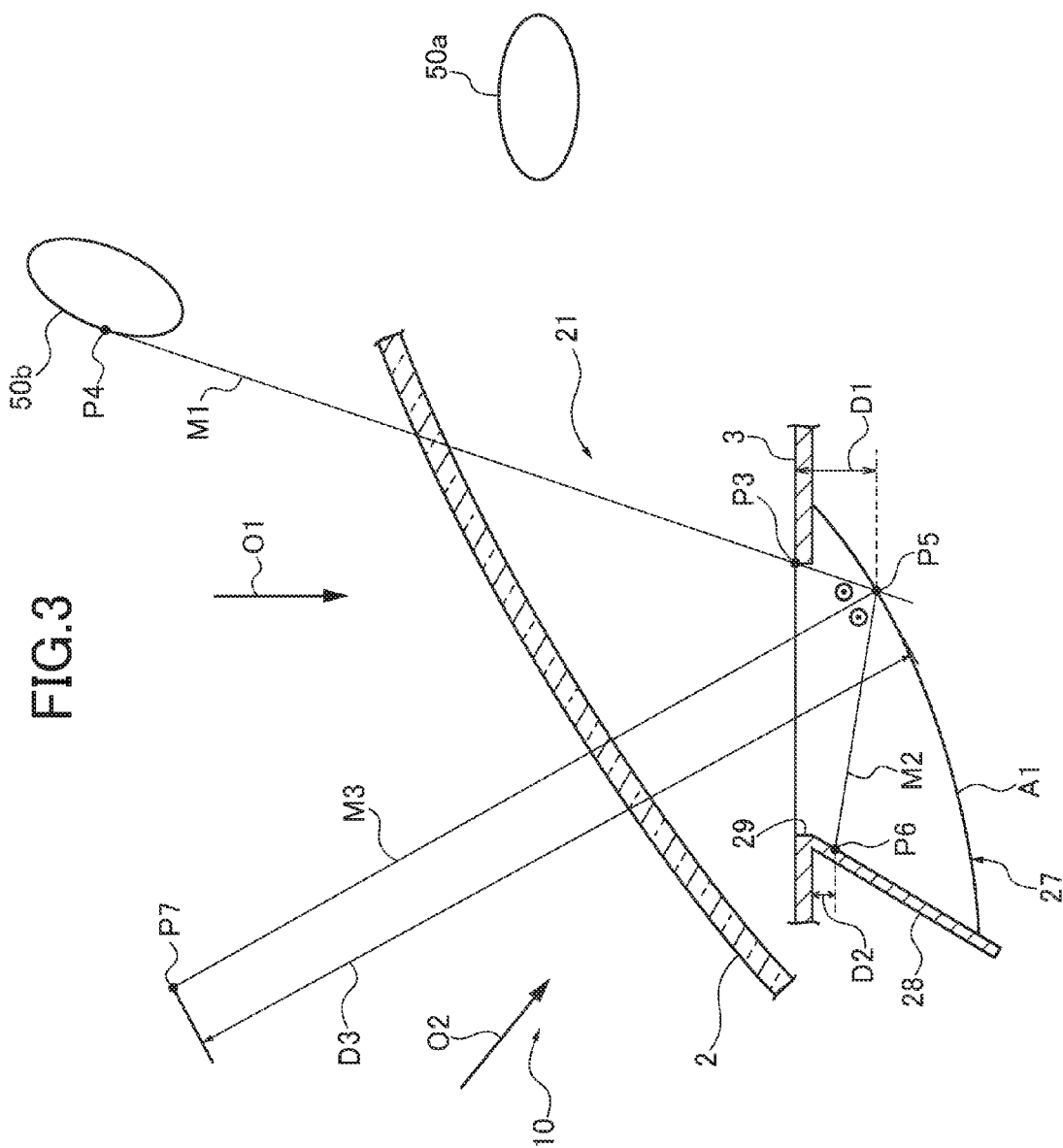
FIG. 3 is a first view for explaining procedures of designing a curvature of a dustproof cover in the head-up display for vehicle of Embodiment 1.
Figure 5:
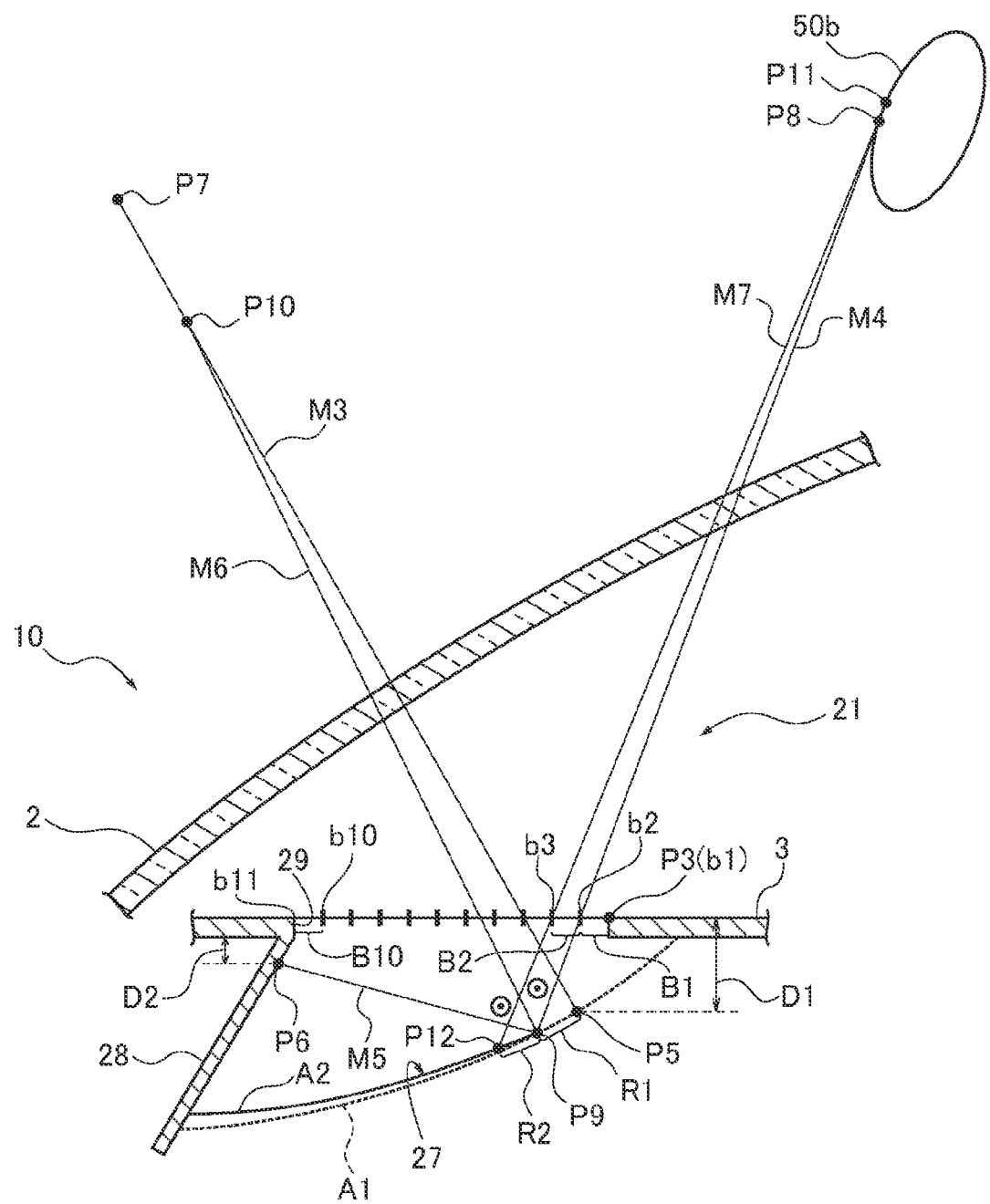
FIG. 5 is a second view for explaining procedures of designing the curvature of the dustproof cover executed subsequently to the procedures shown in FIG. 3.

FIGS. 3 and 5 are views explaining procedures to set the shape (curvature) of the recessed (upper) surface of the dustproof cover 27. A setting according to the procedure shown in FIG. 3 is first executed and a setting according to the procedure shown in FIG. 5 is then executed.

The shape (curvature) of the dustproof cover 27 is set to reflect in the direction where the driver cannot see outside light from an exterior of the vehicle 10 incoming in the vehicle.

A coordinate system used to decide the shape (curvature) of the dustproof cover 27 is first described with reference to FIG. 3. In this embodiment, the outside light reflected on the dustproof cover 27 should not enter an ellipse-shaped eye range 50a representing statistical distribution of positions of eye balls of a plurality of drivers (in other words, the drivers cannot see the outside light). To easily confirm this, the shape of the dustproof cover 27 is set such that a virtual eye range 50b is adjusted by moving the ellipse-shaped eye range 50a at a line symmetrical position thereto with respect to the windshield 2 (light-transmitting member) and so the outside light reflected on the dustproof cover 27 does not enter the virtual eye range 50b.

In the opening 29 shown in FIG. 3, a tangent M1 extending from a point P3 of a rearmost portion of the opening 29 to a left edge (corresponding to a lower edge of the eye range 50a) of the virtual eye range 50b is first drawn. At this time, a contact P4 is set on the virtual eye range 50b.

The tangent M1 is reversely extended from the opening 29 toward a depth of the instrument panel 3 to set a point P5 at a position of a predetermined distance D1 (for example, 10 mm) from the opening 29 to a depth of the instrument panel. The point P5 is a point on a surface of the dustproof cover 27.

Next, a segment M2 connecting the point P5 and a point P6 positioned below an upper end of the rising wall 28 by a predetermined distance D2 (for example, 5 mm) is set.

In addition, a bisector M3 of an angle formed by the tangent M1 and the segment M2 passing through the point P5 is set.

Next, a point P7 is set at a position which is on the set bisector M3 and has a predetermined distance D3 (for example, 1000 mm) from the point P5.

A circular arc A1 drawn to center on the set point P7 and passing through the point P5 is set. The circular arc A1 shows an initial shape of the dustproof cover 27. In other words, the point P7 is a center of curvature of the circular arc A1.

According to the circular arc A1 set in this way, outside light O1 entered the point P5 from a range of the bisector M3 and the tangent M1 is regularly reflected on the point P5 and moves to a range between the bisector M3 and the segment M2. In addition, outside light O2 entering the point P5 from a range between the bisector M3 and the segment M2 is regularly reflected on the point P5 and moves to a range between the bisector M3 and the tangent M1.

If light emitting from the point P6 on the rising wall 28 and reaching the point P5 is considered, the light is regularly reflected on the point P5 and reaches a position of the contact P4 on the virtual eye range 50b. That is to say, the light is invisible to the driver since it reaches a lower end of the eye range 50a. Since the rising wall 28 has areflexion, the light is actually not emitted from the rising wall 28. The outside lights O1 and O2 reaching the point P5 each do not reach an inner portion of the virtual eye range 50b and are invisible to the driver.

After that, the setting shown in FIG. 5 is subsequently executed. Here, the opening 29 is first divided in a plurality of strip-shaped opening divided regions B1, B2, . . . which extend in a right-to-left direction (direction perpendicular to space of FIG. 7) of the vehicle 10 and have equal areas (lengths in FIG. 5) to each other. In an example of FIG. 5, the opening is divided in the opening divided regions B1, B2, . . . , B10 in order from the rear side of the vehicle 10. Note that the opening is divided into ten opening divided regions B1, B2, . . . , B10 in FIG. 5, but the divided number of the opening is suitably set without being limited to the ten opening divided regions.

At this time, an endpoint is set with respect to each of the opening divided regions B1, B2, . . . , B10 which are divided. That is to say, endpoints b1, b2, . . . , b11 from the rear side to the front side of the vehicle 10 (from right side to the left side of the space of FIG. 5) are set. For example, the opening divided region B1 has the endpoint b1 in the rear side of the vehicle and the endpoint b2 in the front side of the vehicle. The opening divided region B10 has the endpoint b10 in the rear side of the vehicle and the endpoint b11 in the front side of the vehicle. Here, the endpoint b1 of the endpoints b1, b2, . . . , b11 corresponds to the point P3 described in FIG. 3.

The circular arc A1 set by the procedure shown in FIG. 3 represents a shape (curvature) of a first region R1 which is a region of the dustproof cover 27 corresponding to the opening divided region B1.

Then, a shape (curvature) of a second region R2 which is a region of the dustproof cover 27 corresponding to the opening divided region B2 is set by the setting shown in FIG. 5. A shape (curvature) of a region of the dustproof cover 27 corresponding to each of the opening divided regions B3, . . . , B10 is therefore sequentially set recursively.

A procedure of setting the shape (curvature) of the second region R2 which is the region of the dustproof cover 27 corresponding to the opening divided region B2 formed between the endpoint b2 and the endpoint b3 in the dustproof cover 27 is concretely described hereinafter.

A tangent M4 extending from the endpoint b2 in the rear side of the vehicle 10 to the left edge of the virtual eye range 50b is first drawn. At this time, a contact P8 is set on the virtual eye range 50b.

Next, a point P9 which is an intersection point with the circular arc A1 set in FIG. 3 is set by extending the tangent M4 reversely from the endpoint b2. The first region R1 which is a region between the point P9 and a point P5 is decided by this setting. It is decided that the first region R1 in the longitudinal section of the dustproof cover 27 is formed by the circular arc A1 having the center of curvature of the point P7.

A segment M5 connecting the point P9 and the point P6 disposed below the upper end of the rising wall 28 by the predetermined distance D2 (for example, 5 mm) is set.

Next, a bisector M6 bisecting an angle between the tangent M4 and the segment M5 and passing through the point P9 is decided.

A point P10 which is an intersection point of the decided bisector M6 and the previously set bisector M3 is obtained.

A circular arc A2 passing through the point P9 and centering on the point P10 set in this way is set. With the circular arc A2 set in this way, the shape (curvature) of the region of the dustproof cover 27 from the point P9 toward front side of the vehicle 10 is updated from the circular A1 to the circular arc A2.

Next, a tangent M7 is drawn from the endpoint b3 toward the left edge of the virtual eye range 50b. At this time, a contact P11 is set on the virtual eye range 50b.

Then, a point P12 which is an intersection point with the previously set circular arc A2 is set by extending the tangent M7 reversely from the endpoint b3. By this setting, the second region R2 which is the region between the point P12 and the point P9 is decided on the circular arc A2. The second region R2 formed by the circular arc A2 around the point P10 as the center of curvature forms the longitudinal section of the dustproof cover 27, continuous to the circular arc A1 as previously decided.

At this time, the point P10 which is the center of curvature of the second region R2 of the dustproof cover 27 corresponding to the opening divided region B2 adjacent to the opening divided region B1 is set on the bisector M3 (segment) connecting the point P7 which is the center of curvature of the first region R1 of the dustproof cover 27 corresponding to the opening divided region B1 and the point P5 of the first region R1 at the rearmost side of the vehicle 10. The shape of the longitudinal section of the dustproof cover 27 is therefore set such that a curvature increases (a radius of curvature reduces) toward the front side of the vehicle 10.

Thereafter, the same procedure as the above is sequentially repeated with respect to all of the opening divided regions. A curvature of a region of the dustproof cover 27 corresponding to each opening divided region is therefore sequentially decided.

Note that, in the foregoing explanation, the ten opening divided regions B1, B2, . . . , B10 are set. However, when the opening divided regions are more finely divided, a further smooth shape (curvature) of the dustproof cover 27 can be acquired.

The dustproof cover 27 set in this way is formed in such a recessed surface that the curvature increase (the radius of curvature reduces) toward the front side of the vehicle, as described above. It is, therefore, possible to reduce a size of the dustproof cover 27 in a depth direction, compared to a dustproof cover formed by a curved surface having a fixed curvature.

When the shape of the dustproof cover 27 is decided, a mold for the dustproof cover 27 is manufactured based on the curvature data. A dustproof cover 27 is manufactured through, for example, injection molding by the manufactured mold.

As one example, according to an estimation condition, when a depth of the dustproof cover 27 manufactured with a fixed curvature is about 55.5 mm, if the shape (curvature) of the dustproof cover 27 is set based on the procedure described in Embodiment 1, it is possible for the dustproof cover to acquire the depth of about 42.0 mm, and hence the downsize of about 25 percent.

Next, a series of flows of the procedures as described above is described with reference to flow charts shown in FIGS. 4 and 6. The procedure of setting the shape of the dustproof cover is described.

Figure 4:
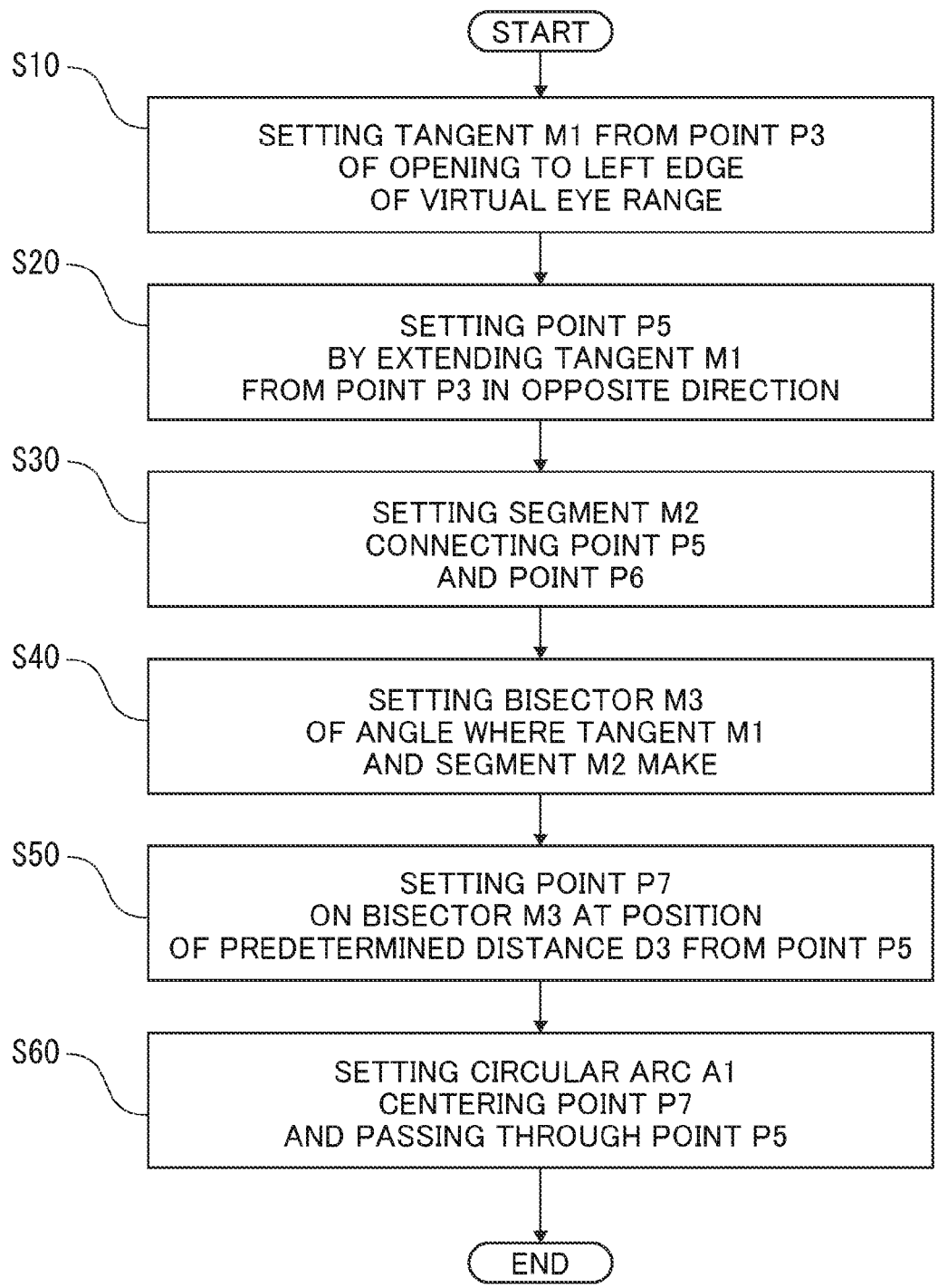
FIG. 4 is a flow chart illustrating the design procedures shown in FIG. 3.

FIG. 4 is the flow chart illustrating the procedure shown in FIG. 3.
(Step S10)
The tangent M1 extending from the point P3 at the rearmost side (with respect to the vehicle 10) of the opening 29 to the left edge of the virtual eye range 50b is set.
(Step S20)
The point P5 advancing to the depth from the opening by the predetermined distance D1 is set by extending reversely the tangent M1 from the point P3.
(Step S30)
The segment M2 connecting the point P5 and the point P6 disposed below the upper end of the rising wall 28 by the predetermined distance D2 is set.
(Step S40)
The bisector M3 bisecting the angle between the tangent M1 and the segment M2 and passing through the point P5 is set.

(Step S50)
The point P7 is set at the position of the predetermined distance D3 from the point P5 on the bisector M3.
(Step S60)
The circular arc A1 centering on the point P7 and passing through the point P5 is set.

FIG. 6 is the flow chart illustrating the procedure described in FIG. 5.
(Step S100)
The opening divided regions B1, B2, . . . , B10 are set by equally dividing the opening 29. Here, this processing may be executed before step S1 shown in FIG. 4.
(Step S110)
A variable i to uniquely specify the opening divided regions B1, B2, . . . , B10 is set. By first setting to be i=2, the processing with respect to an opening divided region Bi, that is, the opening divided region B2 is set to be performed.
(Step S120)
A tangent (for example, the tangent M4) extending from an endpoint bi (for example, the endpoint b2) toward the left edge of the virtual eye range 50b is set.
(Step S130)
The point (for example, the point P9) which is the intersection point with the circular arc A1 is set by extending reversely the tangent (for example, the tangent M4) from the endpoint bi (for example, the endpoint b2).
(Step S135)
The shape between the two points (for example, the point P9 and the point P5) which are partial regions of the dustproof cover 27 is decided to be a circular-arc shape (for example, the circular arc A1).
(Step S140)
The segment (for example, the segment M5) connecting a point (for example, the point P9) on the dustproof cover 27 and the point P6 is set.
(Step S150)
The bisector (for example, the bisector M6) of the angle between the tangent (for example, the tangent M4) passing through the point (for example, the point P9) on the dustproof cover 27 and the segment (for example, the segment M5) is set.
(Step S160)
The point (for example, the point P10) which is the intersection point of the bisector (for example, the bisector M6) and the bisector (for example, the bisector M3) is set.
(Step S170)
The circular arc A2 (Ai) centering on a point (for example, the point P10) which is the center of curvature and passing through a point (for example, the point P9) is set. The circular arc A2 (Ai) corresponds to the shape (curvature) of the dustproof cover 27 in the front side of the vehicle 10 from the point (for example, the point P9).
(Step S180)
It is determined that the processing is completed when the endpoint b10, that is, the opening divided region B10 has been reached. When the processing is completed, the flow chart shown in FIG. 6 is completed, and when the processing is not completed, the flow proceeds to step S190.
(Step S190)
The step increments the variable i and is set to execute processing with respect to an opening divided region Bi corresponding to the incremented variable i (=i+1). The flow then proceeds to step S120.

Thereafter, the processing from step S120 to step S180 is repeatedly executed while changing the opening divided region Bi.

Here, the procedures described with reference to FIGS. 3 to 6 are of one example of procedures necessary to acquire the shape (curvature) of the dustproof cover 27, and a method of deciding the shape (curvature) of the dustproof cover 27 is not limited to the procedures. In other words, although the shape (curvature) of the dustproof cover 27 is sequentially set from the rear side to the front side of the vehicle 10 in the procedure as described above, it may be sequentially set from the front side to the rear side of the vehicle 10 or from a central side of the dustproof cover 27 to each of the front and rear sides of the vehicle 10.

In addition, predetermined values used in a series of procedures described above are not limited to the values described above. The suitably set values are applied depending on a system to be designed. A method of correcting distortion of the virtual image is described.

The image displayed on the image display part 23a (FIG. 2B) is displayed as a virtual image 53 having geometrical distortion (hereinafter referred to as distortion simply) since the head-up display apparatus for vehicle 21 has two aspherical optical members of the dustproof cover 27 and the windshield 2 (light-emitting member) on the optical path to form the virtual image 53, as shown in FIG. 1. When the distortion is large, a predetermined shape of the virtual image 53 is not acquired, thereby reducing the visibility. It is therefore necessary to correct the distortion properly.

As the method of correcting the distortion, it is general that a correction optical system to correct the distortion is provided in an optical system imaging the virtual image 53. However, in the head-up display apparatus for vehicle 21, to further easily correct the distortion, a method of previously distorting the image displayed on the image display part 23a in the opposite direction is used.

That is to say, a dimension and a direction of the distortion generated in the virtual image 53 can be estimated, since the shapes of the dustproof cover 27 and the windshield 2 (light-transmitting member) are previously known. Accordingly, the image having the distortion in the opposite direction to that of the generated distortion can be formed. The virtual image 53 having the corrected distortion can be acquired, since the distortion which is not supposed to originally occur is cancelled by projecting the previously distorted image (corrected display image) from the image display part 23a and imaging the virtual image 53.

Here, the image (corrected display image) having the generated distortion and the distortion in the opposite direction can be formed by executing simulation by a light beam tracking method, for example.

As described above, according to the head-up display apparatus for vehicle 21 in Embodiment 1, in reflecting the projection light projected in front of the driver on the windshield 2 (light-transmitting member) and displaying the virtual image 53 visible to the driver, the dustproof cover 27 which closes the opening 29 provided in the path of the projection light is configured to have a recessed surface in which the curvature increases toward the front side of the vehicle 10, and a cylindrical surface in which the recessed surface is continuous throughout the right and left direction of the vehicle 10 so as to allow the projection light to pass therethrough and reflect the outer light entering the opening 29 from above in the direction invisible to the driver. Consequently, it is possible to reduce the size of the dustproof cover in the depth direction, compared with the dustproof cover having the curved surface of the fixed curvature. The space inside the vehicle 10 necessary to contain the head-up display apparatus for vehicle 21 can be therefore reduced.

Moreover, according to the head-up display apparatus for vehicle 21 in Embodiment 1, since the recessed surface constituting the dustproof cover 27 is formed by the curved surface having the different curvatures continuous to the front and rear direction of the vehicle 10, the size in the depth direction of the dustproof cover 27 can be reduced. Since the distortion of the virtual image 53 generated by passing through the dustproof cover 27 is continuous and small, excessive and discontinuous deformation does not occur in the displayed virtual image 53.

Furthermore, according to the head-up display apparatus for vehicle 21 in Embodiment 1, since the rising wall 28 is provided between an edge of the opening 29 in the front side of vehicle 10 and the dustproof cover 27 and the dustproof cover 27 has the shape of the surface configured to reflect the light emitted from the point separated downward from the upper end of the rising wall 28 more than the predetermined distance D2 on the dustproof cover 27 and the windshield 2 (light-transmitting member) and to advance the reflected light downward from the lower end of the eye range 50a of the driver, it is possible to securely prevent the outer light entering the vehicle 10 from the exterior from entering the eye range 50a.

In addition, according to the head-up display apparatus for vehicle 21 in Embodiment 1, since the curvature of the recessed surface of the dustproof cover 27 in the front and rear direction is set to each of the first region R1, the second region R2, . . . , which are the regions of the dustproof cover 27 corresponding respectively to the plurality of strip-shaped opening divided regions B1, B2, . . . , B10 provided to divide the opening 29 throughout the front and rear direction of the vehicle 10, it is possible to set the shape (curvature) of the dustproof cover 27 with simple calculation processing.

Moreover, according to the head-up display apparatus for vehicle 21 in Embodiment 1, since, of the opening divided regions (for example, the opening divided regions B1 and B2) adjacent to each other, based on the curvature of the region (for example, the first region B1) of the dustproof cover 27 corresponding to the one opening divided region (for example, the opening divided region B1), the curvature of the region (for example, the second region R2) of the dustproof cover 27 corresponding to the other opening divided region (for example, the opening divided region B2) is set, it is possible to set the shape (curvature) of the dustproof cover 27 sequentially and simply.

Furthermore, according to the head-up display apparatus for vehicle 21 in Embodiment 1, since, of the opening divided regions (for example, the opening divided regions B1 and B2) adjacent to each other, the point (for example, the point 10) which is the center of curvature of the region (for example, the second region R2) of the dustproof cover 27 corresponding to the other opening divided region (for example, the opening divided region B2) is set on the segment (for example, the bisector M3) connecting the point (for example, the point 7) which is the center of curvature of the region (for example, the first region R1) of the dustproof cover 27 corresponding to the one opening divided region (for example, the opening divided region B1) and the point (for example, the point 5) of the region (for example, the first region R1) of the dustproof cover 27 at the rearmost side of the vehicle 10, it is possible to set the shape (curvature) of the dustproof cover 27 sequentially and simply.

In addition, according to the head-up display apparatus for vehicle 21 in Embodiment 1, since the infrared reflection coating is applied to the dustproof cover 27, heat can be prevented from transferring to the interior of the head-up display apparatus for vehicle 21. It is, therefore, possible to prevent the temperature of the head-up display apparatus for vehicle 21 from rising, thereby increasing the durability of the head-up display apparatus for vehicle.

In addition, according to the head-up display apparatus for vehicle 21 in Embodiment 1, since the virtual image 53 is formed by projecting the previously corrected image (corrected display image) from the image display part 23a so as to cancel the geometric distortion of the virtual image 53 generated by passing the projection light through the dustproof cover 27 and reflecting it on the windshield 2 (light-transmitting member), it is possible to easily correct the geometric distortion of the display image without using a complicated optical system.

Note that, in Embodiment 1 as described above, although the example using the windshield of the vehicle 10 as the light-transmitting member has been described, a reflection panel (combiner of separation type) having translucency provided separately from the windshield 2 other than the windshield 2 as the light-transmitting member may be used.

Although the embodiment according the present invention has been described in detail with reference to the drawings, the embodiment is a mere example of the present invention. Accordingly, even if there are changes in design within a scope that does not depart from the gist of the invention, the changes should be included in the invention without being limited to only the configuration of the embodiment.

CROSS-REFERENCE TO RELATED APPLICATION

This application is based upon and claims the benefit of priority to Japanese Patent Application No. 2014-152227, filed on Jul. 25, 2014, the entire disclosure of which is incorporated herein by reference.

REFERENCE SIGNS LIST 2 windshield (light-transmitting member)
21 head-up display apparatus for vehicle
23a image display part
25, 26 light path-forming components
27 dustproof cover
28 rising wall
29 opening
51 light flux
52 reflection light flux
53 virtual image
91 eye balls

The invention claimed is:

1. A head-up display apparatus for a vehicle that reflects projection light projected in front of a driver on a light-transmitting member and displays a virtual image visible to the driver, the head-up display apparatus comprising:
an instrument panel having an opening through which the projection light passes from a position below the opening;
a dustproof cover configured to close the opening and to reflect outer light entering the opening from a position above the vehicle, the dustproof cover being configured to reflect the outer light in a direction invisible to the driver; and
a rising wall between a front side edge of the opening closest to a front of the vehicle and the dustproof cover, the rising wall extending upward throughout the right and left direction of the vehicle;
wherein the dustproof cover includes a curved recessed surface shaped such that a curve of the recessed surface increases toward a front side of the vehicle,
wherein the recessed surface is formed by a curved surface having continuous different curvatures throughout a front and rear direction of the vehicle, and
wherein each region of the recessed surface in the front and rear direction of the dustproof cover has a curvature corresponding to a respective one of a plurality of strip-shaped regions of the opening arranged along the front and rear direction of the vehicle.

2. The head-up display apparatus according to claim 1, wherein a curvature of a second region of the recessed surface adjacent to a first region of the the recessed surface is set based on a curvature of the first region of the recessed surface corresponding to a first one of the strip-shaped regions of the opening.

3. The head-up display apparatus according to claim 2, wherein a center of curvature of the second region of the recessed surface corresponding to a second one of the strip-shaped regions of the opening is set on a segment connecting a center of curvature of the first region of the recessed surface corresponding to the first one of the strip-shaped regions of the opening and a point of the first region at the rearmost side of the vehicle.

4. The head-up display apparatus according to claim 1, further comprising an infrared reflection coating applied to the recessed surface of the dustproof cover.

5. The head-up display apparatus according to claim 1, wherein the projection light is projected from a corrected display image which is previously corrected to cancel geometric distortion of the virtual image generated by passing through the dustproof cover reflecting on the light-transmitting member.

6. The head-up display apparatus according to claim 1, further comprising an infrared reflection coating applied to the recessed surface of the dustproof cover,
wherein the projection light is projected from a corrected display image which is previously corrected to cancel geometric distortion of the virtual image generated by passing through the dustproof cover and reflecting on the light-transmitting member.

7. The head-up display apparatus according to claim 1, wherein the rising wall is arranged at an angle relative to a vertical axis of the vehicle such that a forward-most edge of the dustproof cover is located forward of an uppermost edge of the rising wall.

8. The head-up display apparatus according to claim 1, wherein the dustproof cover is curved such that a radius of curvature of a rear portion of the recessed surface of the dustproof cover is greater than a radius of curvature of a forward portion of the recessed surface of the dustproof cover.

* * * * *